(12) United States Patent
Morita (10) Patent No.: US 6,892,162 B2
(45) Date of Patent: May 10, 2005

(54) POSITION-DIRECTION MEASURING APPARATUS AND INFORMATION PROCESSING METHOD

(75) Inventor: Kenji Morita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/366,339

(22) Filed: Feb. 14, 2003

(65) Prior Publication Data

US 2003/0158654 A1 Aug. 21, 2003

(30) Foreign Application Priority Data

Feb. 18, 2002 (JP) ........................................ 2002-040091

(51) Int. Cl.$^7$ ................................................ G06F 3/33
(52) U.S. Cl. ........................ 702/150; 345/2.1; 345/158
(58) Field of Search ................................. 702/158, 159, 702/150; 345/2.1, 2.2, 2.3, 661, 788

(56) References Cited

U.S. PATENT DOCUMENTS

| | | | |
|---|---|---|---|
| 6,342,878 B1 * | 1/2002 | Chevassus et al. | 345/158 |
| 6,611,242 B1 * | 8/2003 | Hongo et al. | 345/2.1 |
| 2002/0140674 A1 | 10/2002 | Okuno et al. | 345/158 |

OTHER PUBLICATIONS

Polhemus, "Fastrack—The Fast and Easy Digital Tracker", Internet Article, www.polhemus.com/fastrack.htm, Dec. 30, 2003.

Ascension Technology Corporation, "Flock Of Birds", Internet Article, www.ascension-tech.com, Dec. 30, 2003.

* cited by examiner

*Primary Examiner*—Kamini Shah
(74) *Attorney, Agent, or Firm*—Fitzpatrick, Cella, Harper & Scinto

(57) ABSTRACT

In a position-direction measuring apparatus that is in principle incapable of determining a true position among two positions which are point symmetrical with respect to a certain point, the invention intends to reduce the possibility of an error and to enable arbitrary setting of the hemisphere at the start of measurement. The invention provides such apparatus including a unit for setting an initial position among two points, a unit for setting a reference position based on a past measurement result, a unit for determining positions of point symmetrical two points from a measurement value, a unit for determining respective distances from the reference position to the point symmetrical two points, and a unit for selecting a position, among the positions of the point symmetrical two points, corresponding to a shorter one of thus determined distances, as a current measurement result.

7 Claims, 10 Drawing Sheets

(PRIOR ART)

FIG. 7

(PRIOR ART)

FIG. 8

|  | X(mm) | Y(mm) | Z(mm) |
|---|---|---|---|
| A | 10 | 10 | 10 |
| A' (POINT OF SYMMETRY) | −10 | −10 | −10 |
| B | 20 | −10 | 20 |
| B' (POINT OF SYMMETRY) | −20 | 10 | −10 |

|     | X(mm) | Y(mm) | Z(mm) |
|-----|-------|-------|-------|
| C   | 10    | 30    | 10    |
| C'  | -10   | -30   | -10   |
| D   | -20   | 30    | -20   |
| D'  | 20    | -30   | 20    |

FIG. 13

|       | DISTANCE(mm) |
|-------|--------------|
| C—D   | 42.4         |
| C—D'  | 61.6         |

FIG. 14

POSITION-DIRECTION MEASURING APPARATUS AND INFORMATION PROCESSING METHOD

BACKGROUND OF THE INVENTION

1. Field of the Invention

The present invention relates to a technology of judging a sensor position utilizing a position-direction measuring apparatus which executes measurement by setting a hemisphere (semi-sphere) with a transmitter positioned at the center thereof and utilizing an assumption that a sensor is present within such hemisphere.

2. Related Background Art

In a virtual reality system or a composite reality system, it is commonly executed to acquire position and direction of a hand or a view position, obtained by a position direction measuring apparatus, and utilizing such information for a synthesis of computer graphics (CG).

As a position direction measuring apparatus of magnetic type, there are known FFASTRAK of Polhemus Corp., U.S. and Flock of Birds of Ascension Corp., U.S.

Such sensor of magnetic type is composed of a transmitter generating a magnetic field, a sensor to be attached to an object of which position and direction are to be measured, and a controlling main body, but, in the position measurement, is in principle incapable of recognizing where the sensor is actually present among two points which is point-symmetrical with respect to the position of the transmitter.

Figure 10:
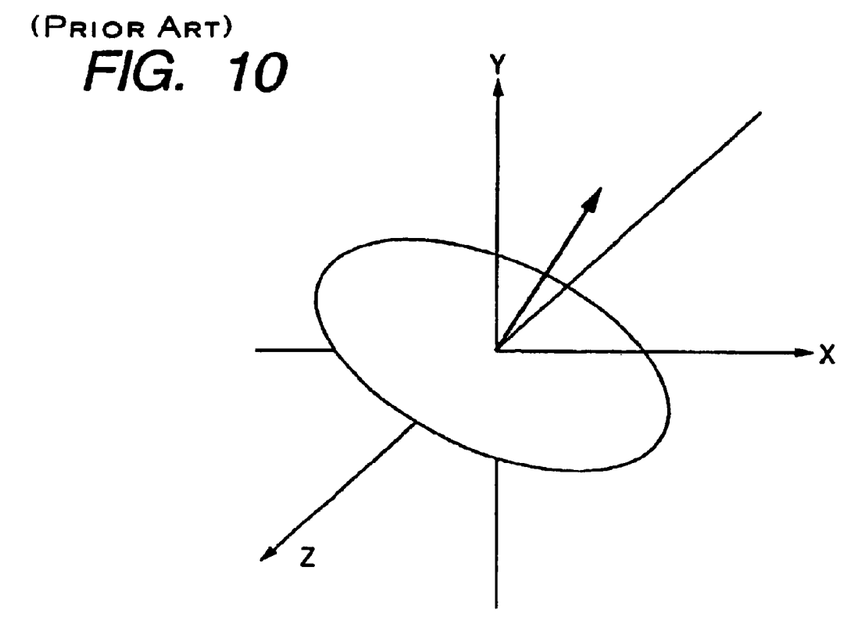
FIG. 10 is a view showing a concept of a hemisphere.

For this reason, the measurement is generally executed by setting a hemisphere around the transmitter and assuming that the sensor is present within such hemisphere. For example a plane as shown in FIG. 10 is taken as a boundary, and the measurement is executed only in a side indicated by an arrow. In such example, the transmitter is assumed to be present at the original point. Therefore the measurable area is inevitably halved.

A manual for the Flock of Birds of Ascension Corp. describes a method of determining the hemisphere in which the sensor is present by tracking the sensor from the past measured values, thereby achieving measurement in the entire sphere.

Figure 8:
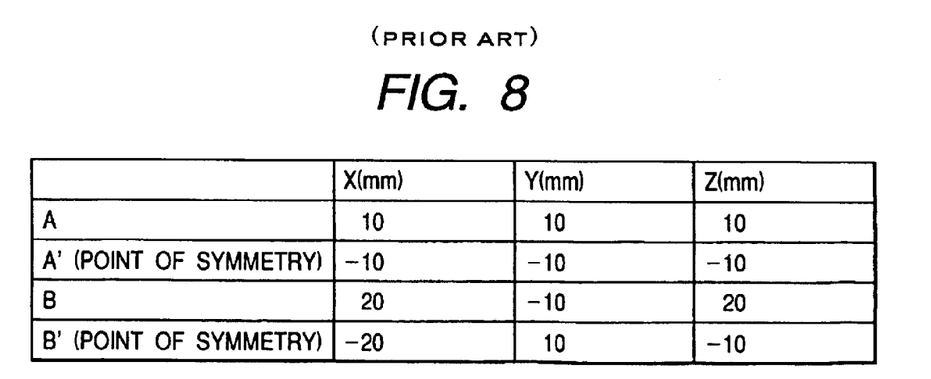
FIG. 8 is a view showing measured values in the example of measurement shown in FIG. 7.
Figure 9:
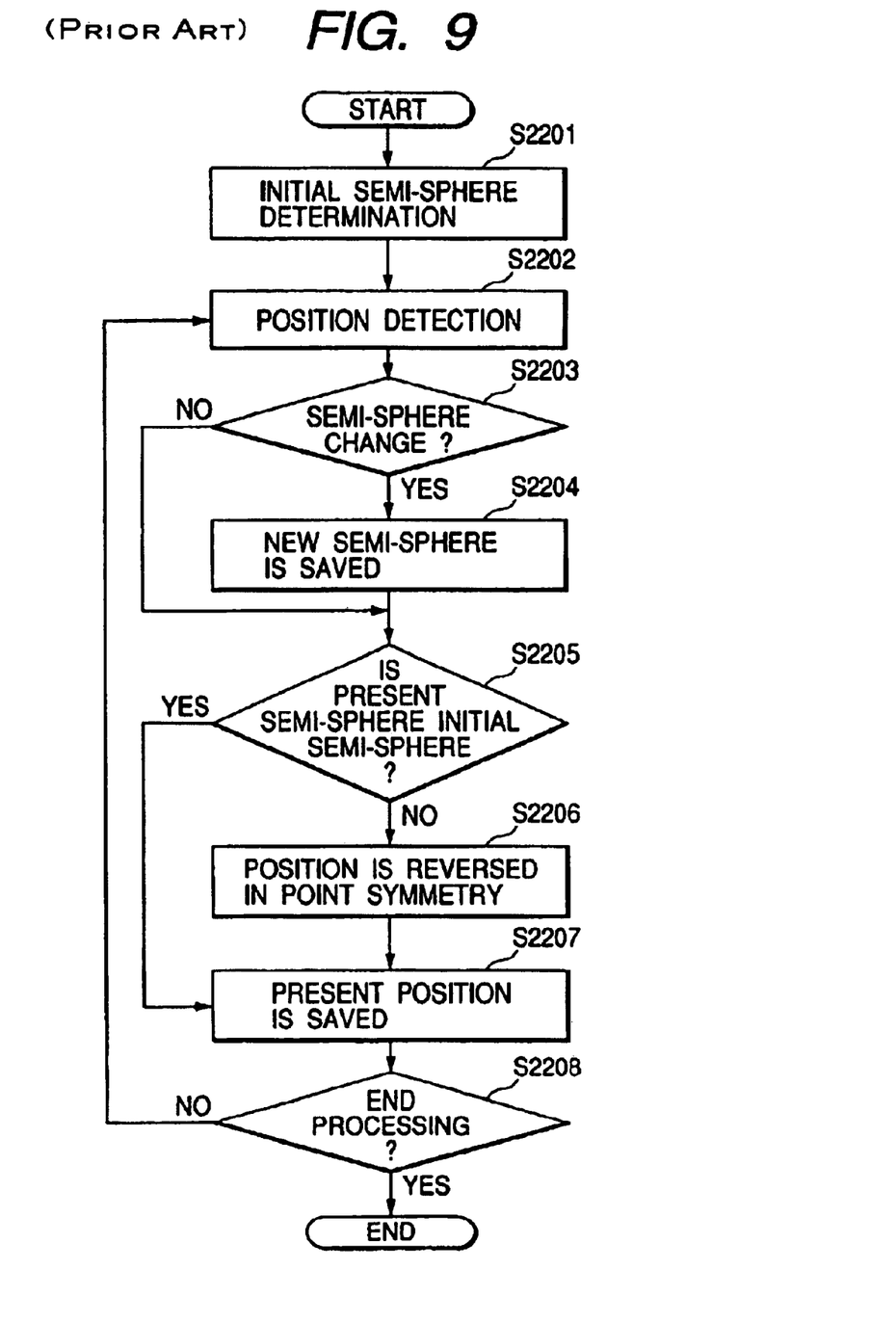
FIG. 9 is a flow chart showing a process of a hemisphere tracking method in a prior example.

FIG. 9 shows a flow of such process, and such process will be explained with an example of measurement shown in FIGS. 7 and 8.

In this measurement, it is assumed that, in an initial state, the sensor is positioned in an upper hemisphere where the Y-value is positive. Even in case the sensor moves to a position where the Y-value is negative, measured values are outputted in point-symmetrical values with respect to the transmitter, namely in inverted values in X, Y and Z.

At first the measurement is initiated by placing the sensor in a position where the Y-value is positive. In this state, the output value from the measuring device coincides with the true value (in hemisphere) (step S2201).

When the measurement is started, a position is detected and position data are acquired from the measuring device (step S2202).

Then, there is discriminated whether signals other than the Y-signal which is assumed to remain positive, namely X-signal and Z-signal, have simultaneously changed signs thereof, and, a shift to another hemisphere is judged to have taken place in case of simultaneous changes of the signs (step S2203). In case of a shift of the hemisphere, there is memorized information indicating a new hemisphere. It is thus possible to memorize the hemisphere judged in the step S2203 (step S2204).

Then there is discriminated whether the hemisphere determined in the step S2203 is the hemisphere assumed by the measuring device (initial hemisphere) (step S2205), and, if it is different from the initial hemisphere, the measured values are converted to point-symmetrical values by respectively inverting the X-, Y- and Z-values (step S2206), and stored as a current position (step S2207). On the other hand, if it is same as the initial hemisphere, the X-, Y- and Z-values are stored as a current position.

The process of the steps S2202 to S2207 will be explained in an example shown in FIG. 7.

Now, let us assume a case where the sensor is moved from A to B. Since the position sensor assumes that the Y-value is positive, the measuring device outputs values of a position B'. In a position shift from A to B', the X-value and the Z-value are simultaneously inverted, so that there can be judged a shift to another hemisphere, namely from A to B, and the position B can be judged as the correct measured value.

However, such discrimination on the shift between the hemispheres may involve an error. More specifically, the sensor may be so moved as to simultaneously change the signs on two axes of which sign is not assumed as positive nor negative.

Figure 7:
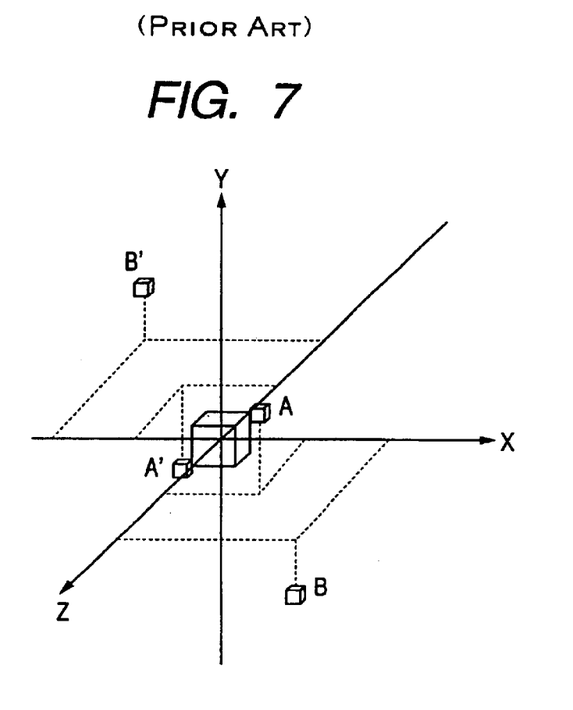
FIG. 7 is a view showing an example of the measuring method in a prior example.

Referring to FIG. 7, in case the sensor moves from A to B' instead of B, the X-value and the Z-value are inverted simultaneously. Therefore, in case the hemisphere is judged by the conventional method shown in FIG. 9, the sensor is judged to be in a position B which is different from the actual position.

Also since the respective signs of X, Y and Z values are used for discriminating the initial hemisphere, the measurement start position of the sensor for determining the initial hemisphere cannot be set in a hemisphere which is inclined to the coordinate system as shown in FIG. 10 but there has to be selected a hemisphere of which each of X-, Y- and Z-values is fixed as positive or negative (namely a hemisphere at above, at below, at right, at left, in front or at rear), so that the installation or operation of the transmitter is limited.

SUMMARY OF THE INVENTION

An object of the present invention is to reduce the possibility of causing an error and to enable arbitrary setting of the hemisphere at the start of measurement for determining the initial hemisphere.

For attaining the above-mentioned objective, the present invention has a following configuration.

In an embodiment of the present invention for attaining the above-mentioned object, there is provided a position-direction measuring apparatus that is in principle incapable of determining a true position among two positions which are point symmetrical with respect to a certain point, the apparatus including a unit for setting an initial position among two points, a unit for setting a reference position based on a past measurement result, a unit for determining positions of point symmetrical two points from a measurement value, a unit for determining respective distances from the reference position to the point symmetrical two points, and a unit for selecting a position, among the position of the point symmetrical two points, corresponding to a shorter one of thus determined distances, as a current measurement result.

In another embodiment of the present invention for attaining the above-mentioned object, there is provided an information processing method for judging a sensor position utilizing a position direction measuring apparatus for setting a hemisphere having a transmitter at the center thereof and executing a measurement based on an assumption that the sensor is present within the hemisphere, the method including steps of acquiring a measured value from the sensor, determining a point symmetrical value indicating a position which is point symmetrical to the above-mentioned measured value with respect to the transmitter, determining distances from a reference value corresponding to a past sensor position to the above-mentioned measured value and to the above-mentioned point symmetrical value respectively, and selecting the above-mentioned measured value or the above-mentioned point symmetrical value corresponding to a shorter one of thus determined distances, as a current sensor position.

Other objects of the present invention, and the features thereof, will become fully apparent from the following detailed description, which is to be taken in conjunction with the accompanying drawings.

DESCRIPTION OF THE PREFERRED EMBODIMENTS

In the following, an embodiment of the present invention will be explained with reference to the accompanying drawings.

(First Embodiment)

Figure 1:
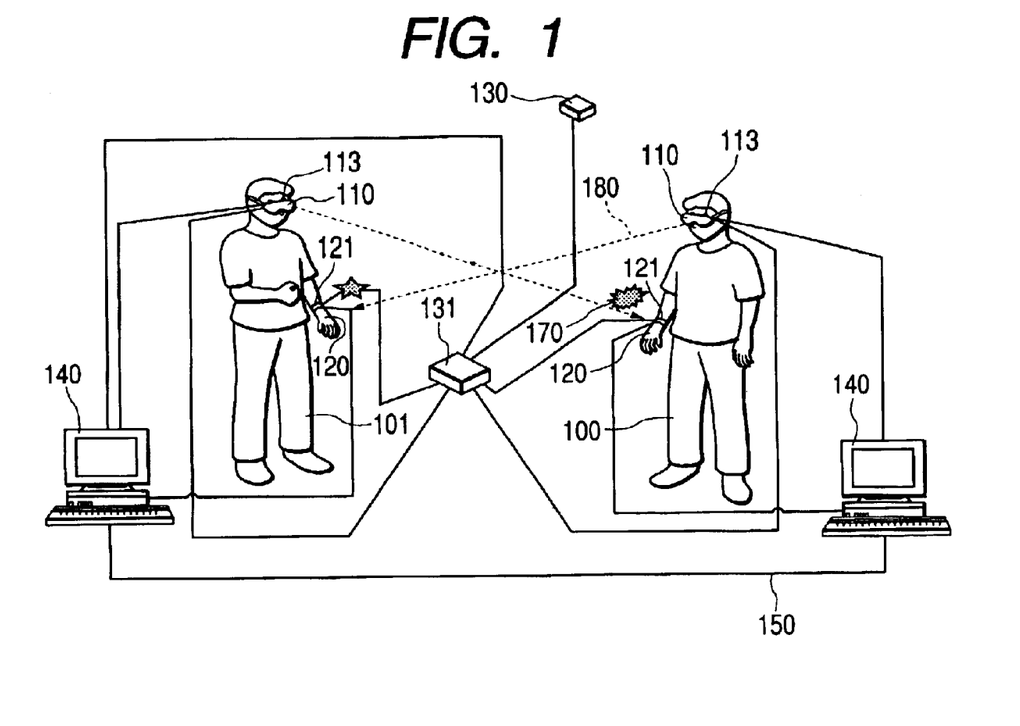
FIG. 1 is a view schematically showing the configuration of a composite reality system embodying a first embodiment.

FIG. 1 is a view schematically showing the configuration of a composite reality system embodying first embodiment.

A first observer 100 wears an HMD (head mount display 110) on the head and a glove 120 on a hand.

Figure 2:
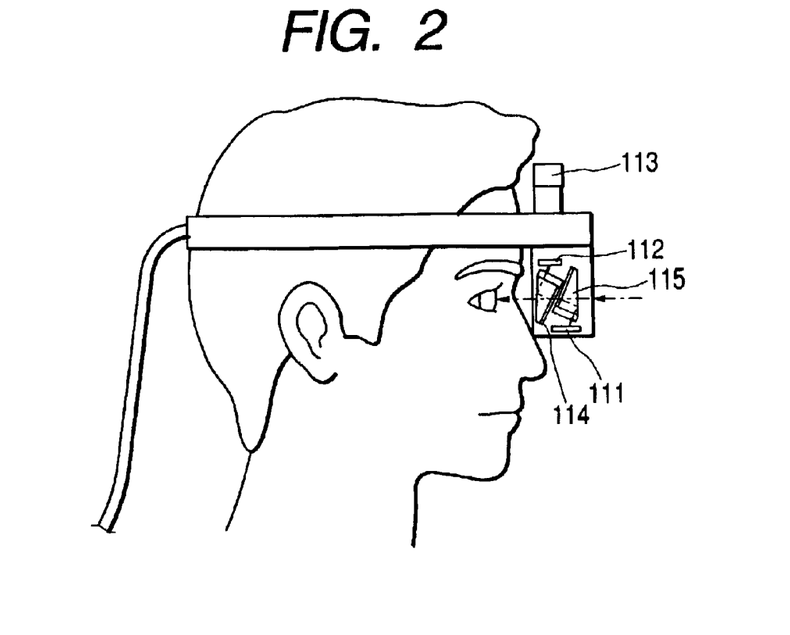
FIG. 2 is a view showing the configuration of an HMD.

The HMD 110 is composed, as shown in FIG. 2, of a video camera 111, an LCD 112, a receiver (eye position sensor) 113 for the position-direction measuring apparatus, optical prisms 114, 115. The video camera 111 captures a real space image at a view position and in a view direction of the observer, guided by the optical prism 115. The eye position sensor 113 is utilized for measuring the view position and the view direction of the observer. The LCD 113 display a composite real space image, which is guided by the optical prism 114 to the eye of the observer.

The glove 120 incorporates a hand position sensor 121, and a loud-speaker (not shown). The hand position sensor 121 is used as a sensor for measuring the position and direction of the hand of the observer. The speaker generates a sound corresponding to an event generated in a hand position. The sound can be, for example, a sound generated when an object in the virtual space is touched or slapped by the hand, or a sound generated when an object in the virtual space, displayed in synchronization of the hand position, changes a state.

There are also shown a transmitter (position sensor transmitter) 130 of the position direction measuring apparatus, and a main body 131 (position sensor main body) of the position direction measuring apparatus. The eye position sensor 113, the hand position sensor 121 and the position sensor transmitter 130 are connected to the position sensor main body 131. The position sensor transmitter 130 emits a magnetic flux, which is received by the dye position sensor 113 and the hand position sensor 121. Based on reception intensity signals from the eye position sensor 113 and the hand position sensor 121, the position sensor main body 131 calculates the position and the direction of the eye and the hand. For the position direction measuring apparatus, there can be utilized, for example, the FASTRAK manufactured by Polhemus Corp., U.S.

A processing apparatus 140 generates a composite reality space image for an observer and displays it in the HMD 110. The processing apparatus 140 may be composed, for example, of a personal computer, a video capture card, a video card having a CG drawing function, a sound card etc. The processing apparatus 140 is connected to the HMD 110, the speaker, and the position sensor main body 131.

A numeral 170 indicates a virtual character which is so composed as if riding on the hand of the first observer 100. A numeral 180 indicates a view line of the first observer. The view line can be measured by the eye position sensor 113, the position sensor transmitter 130 and the position sensor main body 131. A second observer 101 is constructed in a similar manner as the first observer.

In the following there will be explained, with reference to a flow chart shown in FIG. 3, a process of generating a composite virtual space image in the processing apparatus 140.

At first the processing apparatus 140 fetches a view position, a view direction, a hand position and a hand direction, transmitted from the position sensor main body 131 (step S301). The step S301 utilizes a thread S311, for periodically fetching the view position, the view direction, the hand position and the hand direction transmitted from the position sensor main body 131.

Then the time of the virtual space is renewed, and the state of the virtual space (kind, position and state of the virtual space object) is renewed (step S302). In case there exists another virtual space object of which position and direction change in synchronization with the position and the direction of the virtual space object, the state such another virtual space object is also renewed. For example, in case of displaying a virtual character as if riding always on a hand, this step S302 also renews the position and the direction of the glove.

Then a relationship between the position and the direction of the virtual space object (hand position and view position), and the position and the direction of the virtual space object is investigated, and, in case an event defined in advance is judged to have occurred, the state of the virtual space is renewed according to such event (step S303). For example, the virtual space object may be caused to explode when it is touched by the hand.

Then there is fetched a real space image, obtained by the video camera 111 at the view position and the view direction of the observer (step S304). This step S304 utilizes a thread S314 for periodically acquires the real space image, obtained from the video camera 111, from the video capture card.

Then a virtual space image is generated in the view position and the view direction of the observer obtained in the step S301, according to the state of the virtual space renewed in the steps S302, S303 (step S305).

Finally, the virtual space image generated in the step S305 and the real space image fetched in the step S304 are synthesized and outputted to the LCD 112 of the HMD 110 (step S306).

The above-described process is repeated until any ending operation is executed (step S307).

Figure 4:
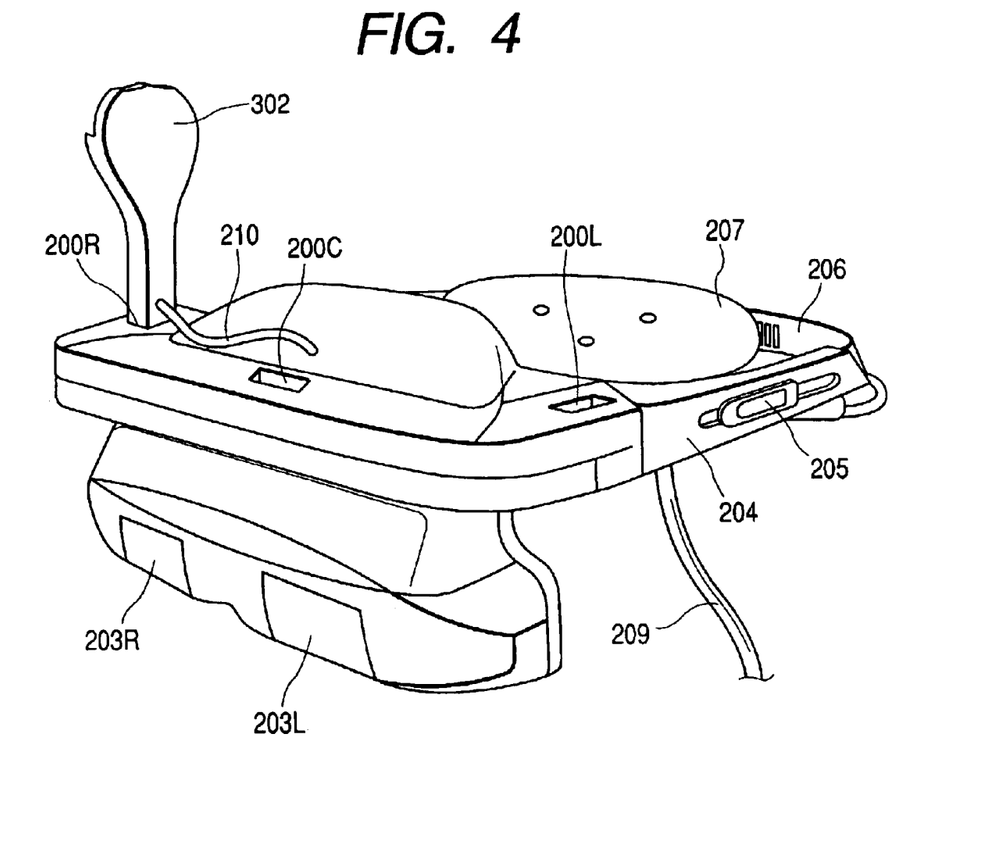
FIG. 4 is an external view of an HMD seen from a direction of an image pickup unit.
Figure 5:
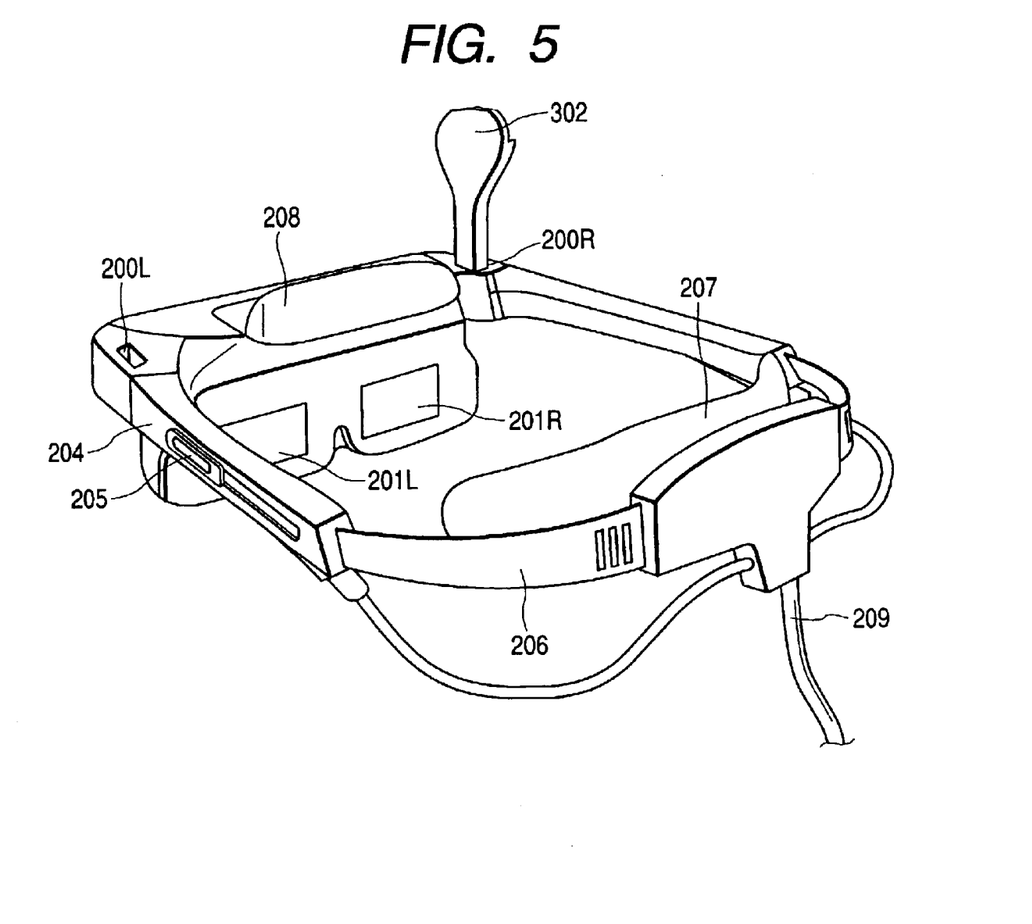
FIG. 5 is an external view of the HMD seen from a direction of a display unit.

FIGS. 4 and 5 are external views of the HMD 110, respectively seen from a direction of an image pickup unit and a direction of a display unit.

An HMD display unit 201 includes a right eye display 201R and a left eye display 201L, each having a color liquid crystal display and a prism, and displaying a composite real space image corresponding to the view position and the view direction of the observer.

Members 204 to 208 constitute a head mounting portion. For mounting the HMD 301 on the head, it is placed on the head in a state where a length adjusting portion 206 is loosened by an adjuster 205. Then, after a forehead mounting portion 208 is brought into contact with the forehead, the length adjusting portion 206 is tightened with the adjuster 205 so as that a lateral head mounting portion 204 and a rear head mounting portion 207 are respectively in contact with a lateral portion and a rear portion of the head.

An HMD image pickup unit 203, for taking the real space image in the view position and the view direction of the observer, includes a right eye image pickup unit 203R and a left eye image pickup unit 203L, each composed of a small video camera of NTSC system. The taken real space image is superposed with the virtual space image to form a composite real space image.

A receiver 302 is used for receiving the magnetic flux emitted from the transmitter, as information for measuring the view position and the view direction of the observer. For connecting the receiver 302 on the HMD 110, there are provided three receiver connecting portions 200R, 200L, 200C, and the receiver 302 can be detachably mounted on any of these receiver connecting portions. In FIGS. 4 and 5, the receiver 302 is connecting on the receiver connecting portion 200R at the right side of the view direction of the observer, but it may also be connected on the receiver connecting portion 200L at the left side of the view direction of the observer, or on the receiver connecting portion 200C on the central line of the observer.

In the present embodiment, the receiver connecting portions 200R, 200L, 200C are so constructed as to have a slot in which the receiver 302 is fitted and fixed, but there may also be adopted any other detachable mounting method.

A receiver signal line 210 is positioned in the vicinity of the receiver connecting portion 200C and is exposed to the exterior of the HMD 301. The receiver signal line 210 has such a sufficient length that the receiver 302 can be connected to any of the receiving connecting portions 200R, 200L, and 200C.

A wire harness 209 collectively includes various lines such as signal lines to the HMD display unit 201 and the HMD image pickup unit, a power supply line and the aforementioned receiver signal line 210, and is mounted on the rear head mounting portion 207. Within the wire harness 209, the signal lines to the left and right display units 201R, 201L and the left and image pickup units 203R, 203L, and the power supply lines thereto pass through the respective side head mounting portions 204 at the left and at the right.

Figure 6:
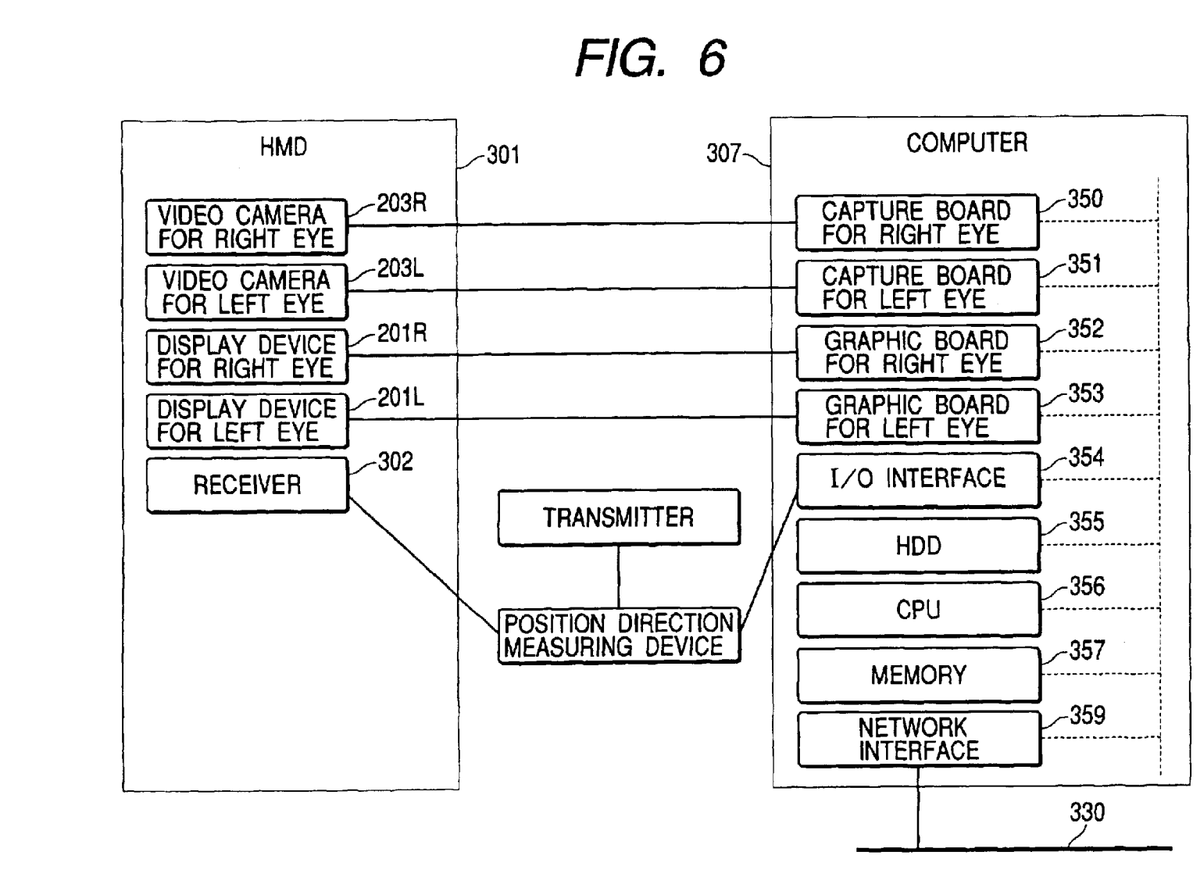
FIG. 6 is a block diagram showing the hardware configuration for an observer in the system shown in FIG. 1.

FIG. 6 is a block diagram showing the hardware configuration for an observer in the system shown in FIG. 1. In a processing apparatus (computer) 307, there are provided a right eye video capture board 350, a left eye video capture board 351, a right eye graphic board 352, a left eye graphic board 353, an I/O interface 354 and a network interface 359, and these components are connected with a CPU 356, an HDD 355 and a memory 357.

The video capture boards 351, 350 for the left and right eyes are respectively connected to the video cameras 203L, 203R for the left and right eyes, and convert real images, fetched by the video cameras 203L, 203R, into formats that can be composed with the virtual space images in the main processing apparatus 307. Also the graphic boards 353, 352 for the left and right eyes are respectively connected to the display units (apparatus) 201L, 201R for the left and right eyes and execute display control for such display units 201L, 201R for the left and right eyes.

Also the I/O interface 354 is connected to the main body 306 of the position direction measuring apparatus, and the network interface 359 is connected to a network 330.

In the following there will be explained the position direction measuring method specific to the present invention.

In FIG. 1, sensors 130, 131, 113, 121 are ordinary magnetic sensors and do not have a function of tracking the hemisphere.

In the following, there will be explained a hemisphere tracking method executed in the computer 140, with reference to a flow chart shown in FIG. 14, and taking the sensor 113 as an example.

At first the sensor 113 is positioned within a predetermined initial hemisphere for starting the measurement, and the measurement is started (step S3301). In this state a measured value is received from the main body 131 of the measuring device and memorized. Then the computer 140 receives the measured value from the main body 131 of the measuring device (step S3302).

Then there is calculated a position which is point symmetrical to the received measured position, with respect to the transmitter (step S3303). In case the transmitter is at the original point, the value of the point symmetrical position can be obtained by inverting the signs of the measured X, Y and Z values.

Then there is calculated a distance between the previous measured value and the position measured in the step S3302 (step S3304). There is also calculated a distance between the previous measured value and the point symmetrical position determined in the step S3304 (step S3305).

Based on the results of the steps S3304 and S3305, a shorter distance is judged as the true value, and a position corresponding to thus judged true value is determined as the sensor position (step S3306).

Figure 3:
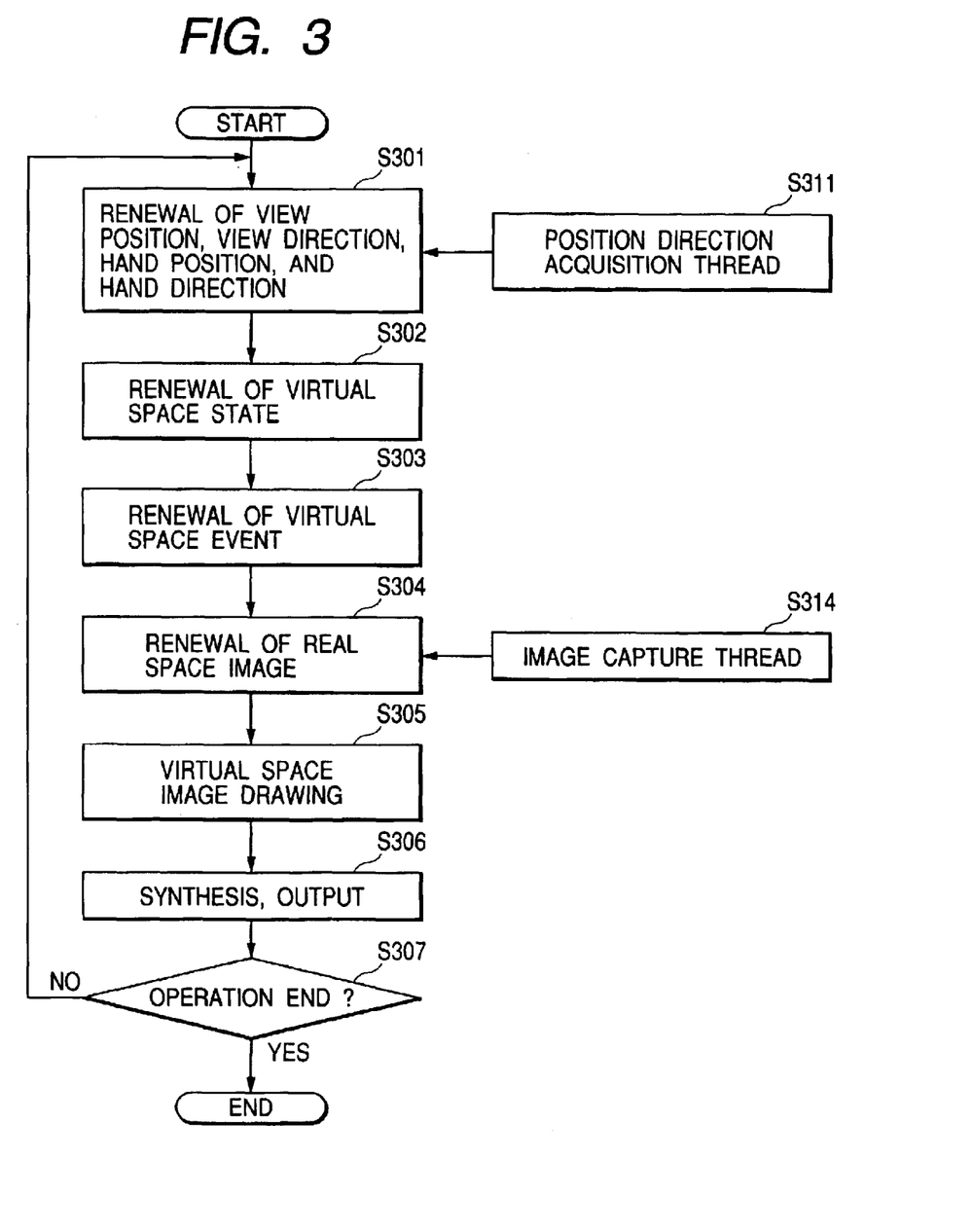
FIG. 3 is a flow chart showing a process for generating a composite reality space image.

The measured value judged as the true value in the step S3306 is transferred to S311 in FIG. 3, and is stored for a next measurement process (step S3307).

The above-described process is repeated until the end. Such process allows the measurement of the entire sphere.

Figure 11:
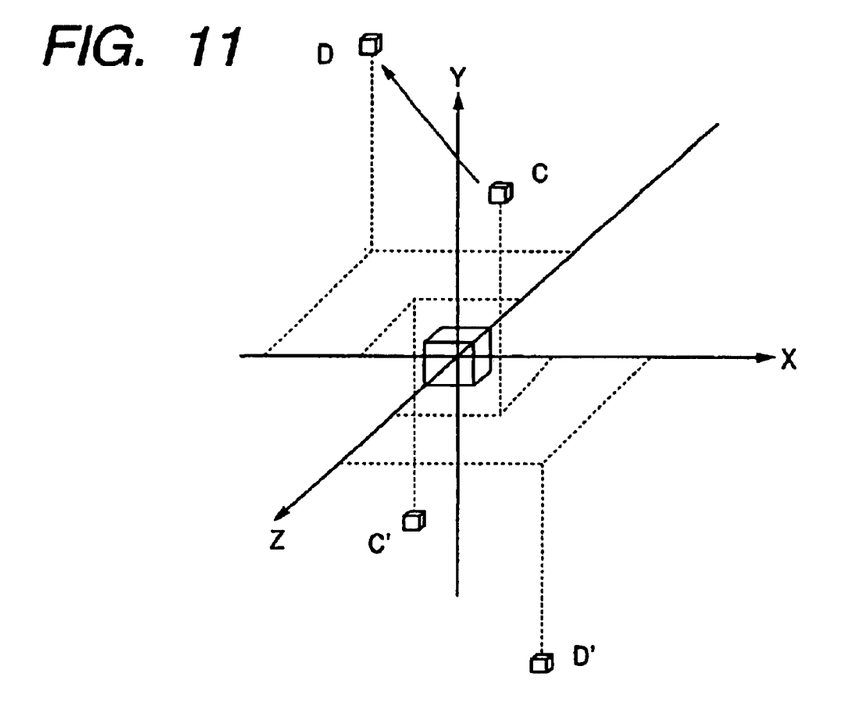
FIG. 11 is a view showing an example of measurement in the first embodiment.
Figure 12:
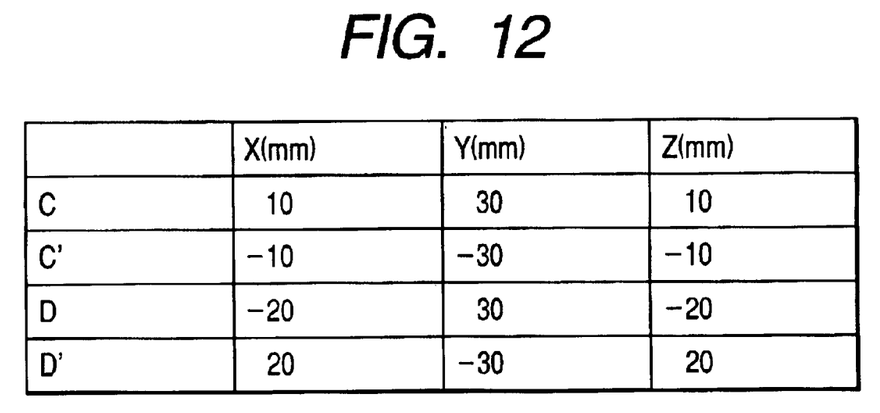
FIG. 12 is a view showing measured values in the example of measurement shown in FIG. 11.
Figure 13:
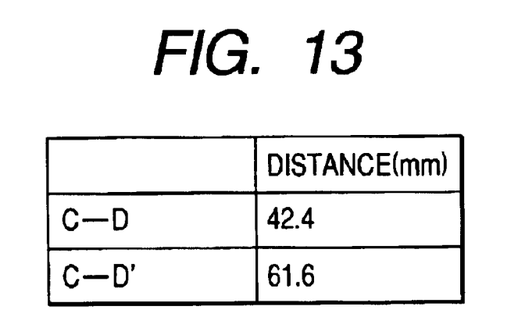
FIG. 13 is a view showing results of calculation in the course of the process of the first embodiment.

The process explained with reference to FIG. 14 will be further explained by an example shown in FIGS. 11, 12 and 13.

The measurement is started with the sensor at first in a position C. In case the sensor has moved from C to D, the prior method results in an erroneous judgment that the sensor has moved to D' because the X and Z values are both inverted as will be apparent from the comparison of the measured values of C and D in FIG. 12. On the other hand, the present embodiment calculates the distances C–D and C–D' and can decide that D is the real position based on a fact that the distance C–D is shorter.

The present embodiment allows, in a position direction measuring apparatus of magnetic type or a similar method that is incapable of identifying the true value among point-symmetrical two points, to estimate with a lower possibility of error the true value among two hemispheres, and also to arbitrarily set the hemisphere at the start of the measurement.

(Other embodiments)

In the embodiment explained in the foregoing, the previous measured position is employed as a reference value in judging the true value of the sensor position. As a variation to such embodiment, it is also possible to employ an average value of two or more measured positions in the past or a value obtained by weighting two or more measured positions in the past.

Figure 14:
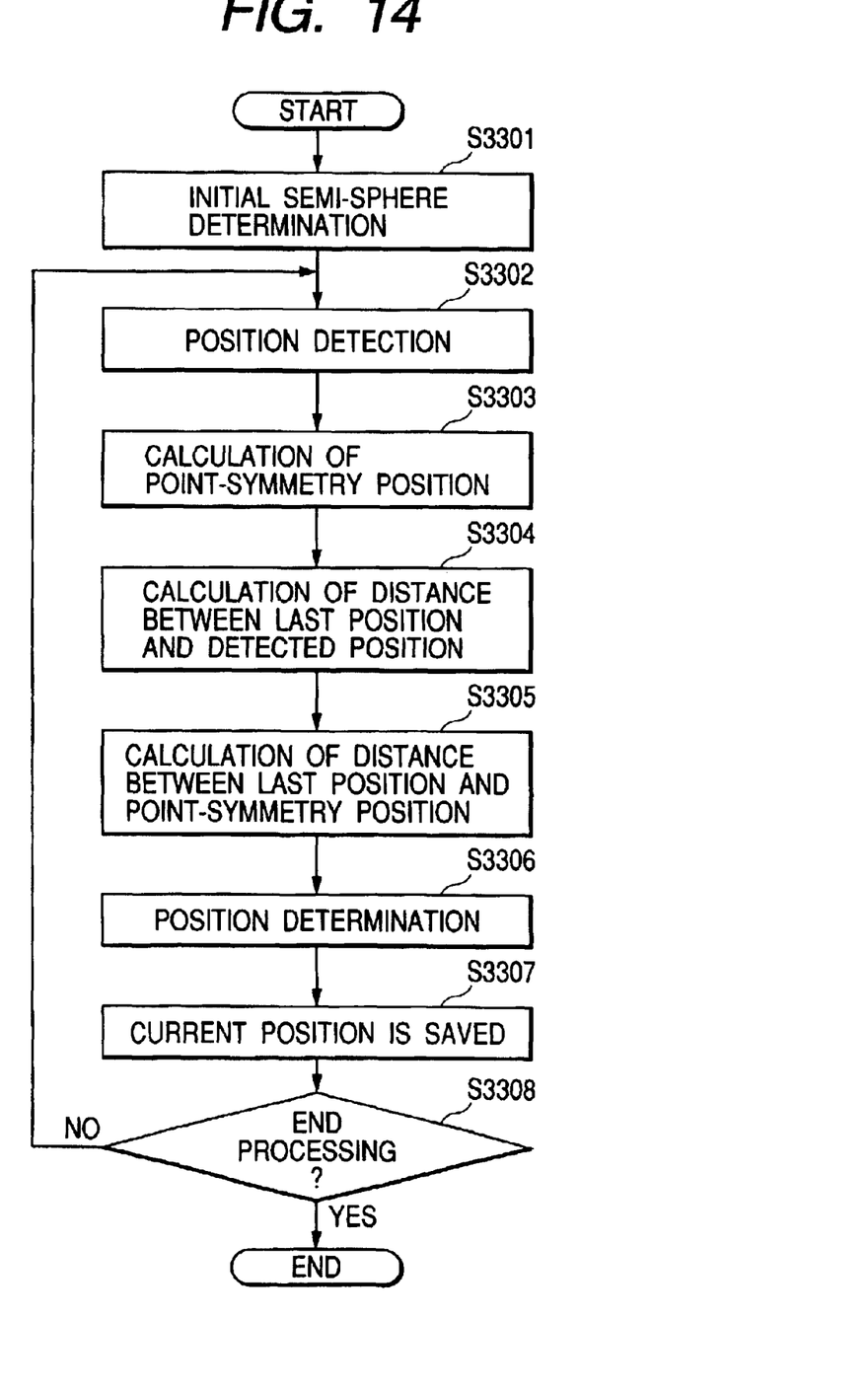
FIG. 14 is a flow chart showing a result of the hemisphere determining method in the first embodiment.

Also the present invention includes a case where the program codes of a software realizing the functions of the aforementioned embodiments are supplied to a computer of a system or an apparatus connected to various devices in order to operate the devices so as to realize the functions shown in FIG. 14 and the functions of the aforementioned embodiments are realized by operating the devices by the computer (CPU or MPU) of the above-mentioned system or apparatus according to the program codes.

In such case the program codes themselves of the software realize the functions of the aforementioned embodiments, and the program codes themselves and the means for supplying the computer with such program codes, for example a memory medium storing the program codes, constitutes the present invention.

The memory medium for supplying such program codes can be, for example, a floppy disk, a hard disk, an optical disk, a magnetooptical disk, a CD-ROM, a magnetic tape, a non-volatile memory card or a ROM.

The present invention also includes such program codes not only a case where the functions of the aforementioned embodiments are realized by the execution of the supplied program codes by the computer but also a case where an operating system or the like functioning on the computer executes all or a part of the actual processes under the control of such program codes thereby realizing the functions of the aforementioned embodiments.

The present invention further includes a case wherein the supplied program codes are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

The present invention is subject to various modifications and alterations within the scope and spirit of the appended claims.

What is claimed is:

1. A position measuring apparatus comprising:
   an initial position unit for setting an initial position among two points;
   a reference position unit for setting a reference position based on a past measurement result;
   a position determining unit for determining a position of two points that are point symmetrical from a measurement value;
   a distance determining unit for determining respective distances from the reference position to the point symmetrical two points; and
   a selecting unit for selecting a position, among the positions of the point symmetrical two points, corresponding to a shorter one of thus determined distances, as a current measurement result.

2. An apparatus according to claim 1, wherein said reference position unit sets a preceding measurement result as said reference position.

3. An apparatus according to claim 1, wherein said reference position unit sets an average of two or more measurement results in the past as said reference position.

4. An apparatus according to claim 1, wherein said reference position unit sets a weighted average of two or more measurement results in the past as said reference position.

5. An information processing method for judging a sensor position utilizing a position measuring apparatus for setting a hemisphere having a transmitter at the center thereof and executing a measurement based on an assumption that the sensor is present within the hemisphere, the method comprising steps of:
   acquiring a measured value from the sensor;
   determining a point-symmetrical value representing a position which is point symmetrical to the measured value with respect to the transmitter, and determining distances from a reference value corresponding to a past sensor position to the measured value and to the point symmetrical value respectively; and
   selecting the measured value or the point symmetrical value corresponding to a shorter one of the distances determined in said determining step, as a current sensor position.

6. A computer program for an information processing method for judging a sensor position utilizing a position measuring apparatus for setting a hemisphere having a transmitter at the center thereof and executing a measurement based on an assumption that the sensor is present within the hemisphere, the method comprising steps of:
   acquiring a measured value from the sensor;
   determining a point-symmetrical value representing a position which is point symmetrical to the measured value with respect to the transmitter, and determining distances from a reference value corresponding to a past sensor position to the measured value and to the point symmetrical value respectively; and
   selecting the measured value or the point symmetrical value corresponding to a shorter one of the distances determined in said determining step, as a current sensor position.

7. A computer readable memory medium storing a computer program for an information processing method for judging a sensor position utilizing a position measuring apparatus for setting a hemisphere having a transmitter at the center thereof and executing a measurement based on an assumption that the sensor is present within the hemisphere, the method comprising steps of:

acquiring a measured value from the sensor;

determining a point-symmetrical value representing a position which is point symmetrical to the measured value with respect to the transmitter, and determining distances from a reference value corresponding to a past sensor position to the measured value and to the point symmetrical value respectively; and selecting the measured value or the point symmetrical value corresponding to a shorter one of the distances determined in said determining step, as a current sensor position.

* * * * *